US006907066B1

United States Patent
Nayler

(10) Patent No.: US 6,907,066 B1
(45) Date of Patent: Jun. 14, 2005

(54) ARRANGEMENT FOR REDUCING TRANSMITTED JITTER

(75) Inventor: Colin D. Nayler, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 612 days.

(21) Appl. No.: 09/634,834

(22) Filed: Aug. 4, 2000

Related U.S. Application Data

(60) Provisional application No. 60/218,571, filed on Jul. 13, 2000.

(51) Int. Cl.$^7$ ................................................ H03K 7/04
(52) U.S. Cl. ...................................... 375/239; 375/373
(58) Field of Search ................................ 375/239, 362, 375/373, 376

(56) References Cited

U.S. PATENT DOCUMENTS

| 4,843,617 | A | * | 6/1989 | Marshall et al. ............ 375/371 |
| 5,041,798 | A | * | 8/1991 | Moorman et al. .......... 331/1 A |
| 5,812,618 | A | * | 9/1998 | Muntz et al. ............... 375/372 |
| 6,094,441 | A |   | 7/2000 | Jung et al. |
| 6,097,732 | A |   | 8/2000 | Jung |
| 6,188,341 | B1 | * | 2/2001 | Taniguchi et al. .......... 341/116 |

\* cited by examiner

*Primary Examiner*—Kevin Burd
(74) *Attorney, Agent, or Firm*—Manelli Denison & Selter PLLC; Leon R. Turkevich

(57) ABSTRACT

A pulse transmitter includes a phase correction module configured for detecting a phase error between a transmit clock and a prescribed clock specification at a transmit clock instance. The transmit clock instance represents an instance in time in which the pulse transmitter is to transmit data according to the prescribed clock specification. The pulse transmitter also includes pulse shape tables, each configured for outputting a corresponding waveform sample set of a prescribed waveform relative to a corresponding phase offset. Hence, the pulse transmitter is able to compensate for phase differences between the transmit clock utilized by the pulse transmitter and the prescribed clock specification, by outputting a selected waveform sample set that has a corresponding phase offset that compensates for the detected phase error, optimizing the performance of pulse position modulation communications systems that are adversely affected by transmit jitter.

17 Claims, 7 Drawing Sheets

ARRANGEMENT FOR REDUCING TRANSMITTED JITTER

This application claims priority from Provisional Application No. 60/218,571, filed Jul. 13, 2000.

BACKGROUND OF THE INVENTION

1. Field of the Invention

The present invention relates to pulse position modulation communications systems, for example home networking physical layer transceivers.

2. Background Art

Local area networks use a network cable or other media to link stations on the network. Each local area network architecture uses a media access control (MAC) enabling network interface cards at each station to share access to the media.

Conventional local area network architectures use a media access controller operating according to half-duplex or full duplex Ethernet (ANSI/IEEE standard 802.3) protocol using a prescribed network medium, such as 10BaseT. Newer operating systems require that a network station be able to detect the presence of the network. In an Ethernet 10BaseT environment, the network is detected by the transmission of a link pulse by the physical layer (PHY) transceiver. The periodic link pulse on the 10BaseT media is detected by a PHY receiver, which determines the presence of another network station transmitting on the network medium based on detection of the periodic link pulses. Hence, a PHY transceiver at station A is able to detect the presence of station B, without the transmission or reception of data packets, by the reception of link pulses on the 10BaseT medium from the PHY transmitter at station B.

Chipsets have being developed that enable computers to be linked together using conventional twisted pair telephone lines instead of established local area network media such as 10BaseT. Such chipsets, implemented according to the Home Phoneline Networking Alliance (HomePNA) Specification 2.0, provide the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air-conditioning systems, etc.

An additional problem in implementing home networks according to the HomePNA specification 2.0 is that the HomePNA specification specifies pulse transmission times relative to a prescribed multiple of reference clock cycles. Specifically, the HomePNA specification defines a TIC time as seven (7) counts of a 60 MHz clock, resulting in a TIC time having a duration of 116.667 nanoseconds: hence, the HomePNA specification requires HomePNA pulses to be transmitted on the boundaries of the 116.667 ns TIC times.

Although the TIC time can be readily generated in a HomePNA transmitter using a divide by seven counter driven by a 60 MHz clock, implementation of the acquired TIC time becomes more difficult if a 60 MHz clock is not readily available, or if a designer prefers not to use a 60 MHz oscillator. For example, existing logic within the physical layer transceiver may utilize different clock speeds requiring a difference the oscillator, such as a 32 MHz clock. In such case, the use of both a 32 MHz based oscillator and a 60 MHz based oscillator may undesirably result in an expensive transceiver.

Attempts to utilize a 32 MHz clock for generation of the 7/60 MHz TIC times, however, results in jitter due to the phase differences between the specified transmit clock (e.g., 7/60 MHz) and the actual transmit clock (e.g., 32 MHz). Hence, the use of an alternative transmit clock may introduce jitter that adversely affects the required low error data rate transmission.

SUMMARY OF THE INVENTION

There is a need for an arrangement that minimizes jitter in transmit waveform communications systems that use a single transmit clock, separate from a specified transmit clock.

There also is a need for an arrangement in a digital transmission system that compensates for phase errors based on frequency differences between a transmit clock utilized by the digital transmission system and a prescribed transmit frequency.

These and other needs are attained by the present invention, where a system such as a pulse transmitter includes a phase correction module configured for detecting a phase error between a transmit clock and a prescribed clock specification at a transmit clock instance. The transmit clock instance represents an instance in time in which the pulse transmitter is to transmit data according to the prescribed clock specification. The pulse transmitter also includes pulse shape tables, each configured for outputting a corresponding waveform sample set of a prescribed waveform relative to a corresponding phase offset. Hence, the pulse transmitter is able to compensate for phase differences between the transmit clock utilized by the pulse transmitter and the prescribed clock specification, by outputting a selected waveform sample set that has a corresponding phase offset that compensates for the detected phase error, optimizing the performance of pulse position modulation communications systems that are adversely affected by transmit jitter.

One aspect of the present invention provides a method in a transmission system configured for outputting a set of waveform samples starting at a transmission time instant according to a transmit clock. The method includes determining a phase error between the transmit clock and a prescribed transmit clock relative to the transmission time instant. The method also includes outputting a selected waveform sample set based on the determined phase error, the waveform sample set having samples of a prescribed waveform relative to a corresponding phase offset, the phase offset of the selected waveform sample set correcting for the determined phase error. Determination of the phase error between the transmit clock and the prescribed transmit clock relative to the transmission time instant enables the transmission system to compensate for the detected phase error, improving the transmission performance of the transmitted waveform to minimize jitter. Moreover, the selection of a waveform sample set having samples of a prescribed waveform relative to a corresponding phase offset enables the precise correction of the determined phase error with minimal complexity.

Another aspect of the present invention provides a transmission system configured for outputting a set of waveform samples starting at a transmission time instant according to a transmit clock. The system includes a pulse shape table circuit configured for outputting a selected waveform sample set of a prescribed waveform relative to a selected phase offset in response to an address signal and a selection signal. The system also includes a phase correction module configured for determining a phase error between the transmit clock and a prescribed transmit clock relative to the transmission time instant, the phase correction module outputting the address signal and the selection signal at the transmission time instant for output of the selected waveform sample set correcting for the determined phase error.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
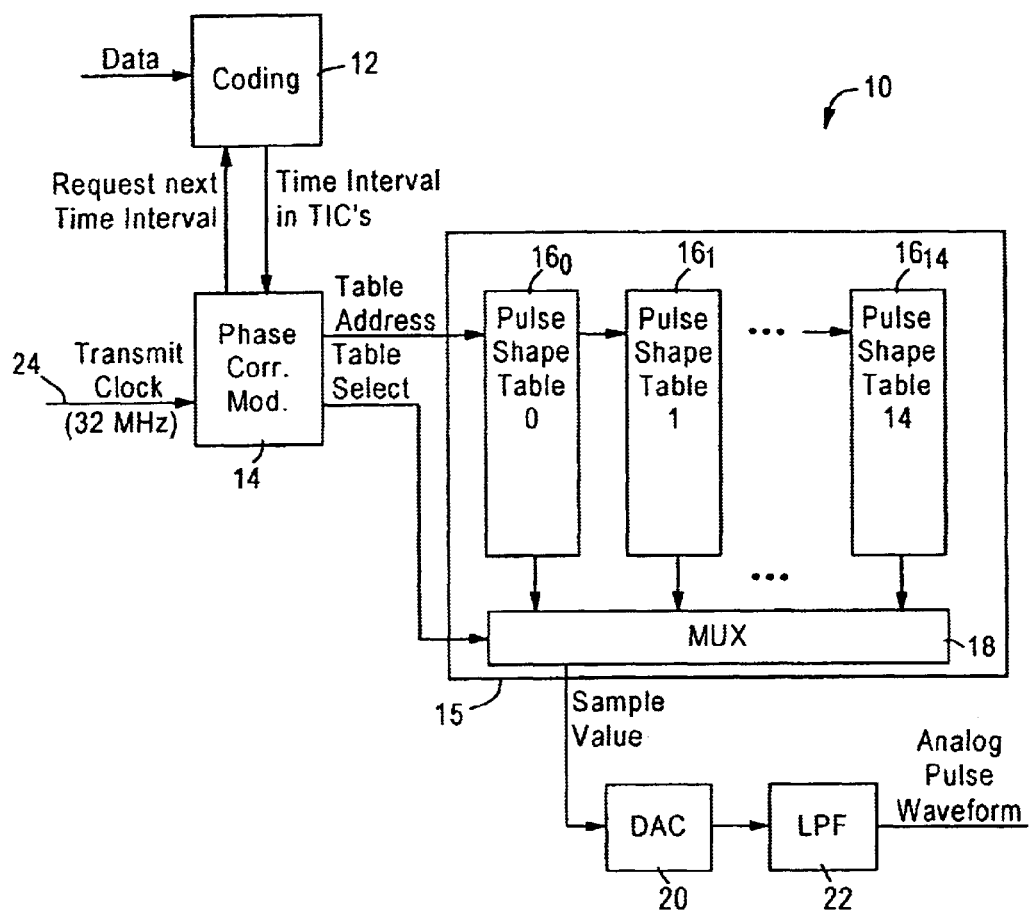
FIG. 1 is a block diagram illustrating a pulse position transmitter having a phase correction system for correcting for determined phase errors between a transmit clock and a prescribed transmit clock according to an embodiment of the present invention.

FIG. 1 is a block diagram illustrating a pulse position modulation communications system 10 configured for outputting an analog pulse waveform at selected transmission time instances according to an embodiment of the present invention. The pulse position modulation communications system 10 may be implemented, for example, in a home PNA physical layer transmitter configured for generating analog home PNA pulses on the boundaries of TIC times that are defined based on a specified transit clock having a normalized period of $7/60$. In particular, the pulse position modulation communications system 10 includes a coding block 12 configured for generating time interval values, representing respective data values, as unit multiples of a 166.667 ns TIC time.

The system 10 also includes a phase correction module 14, and a pulse shape table circuit 15. The pulse shape table circuit 15 includes pulse shape tables 16 and a multiplexer 18. The multiplexer 18 is configured for outputting a selected waveform sample set that corrects for determined phase errors between transmission time instances specified by the time interval values from the coding block 12, and a 32 MHz transmit clock 24.

Figure 2A:
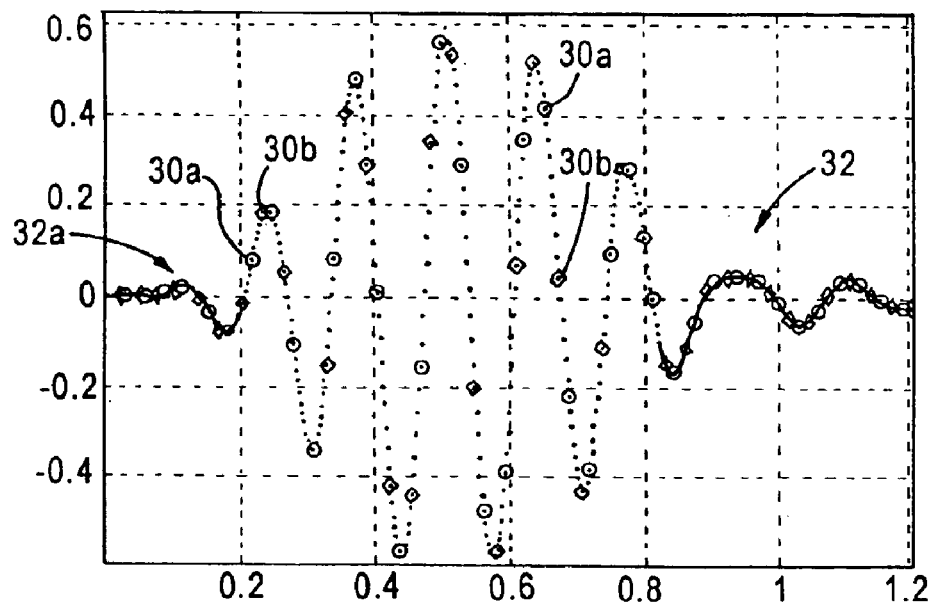
FIGS. 2A and 2B are diagrams illustrating samples of a prescribed transmit pulse waveform generated by the pulse position transmitter of FIG. 1.
Figure 2B:
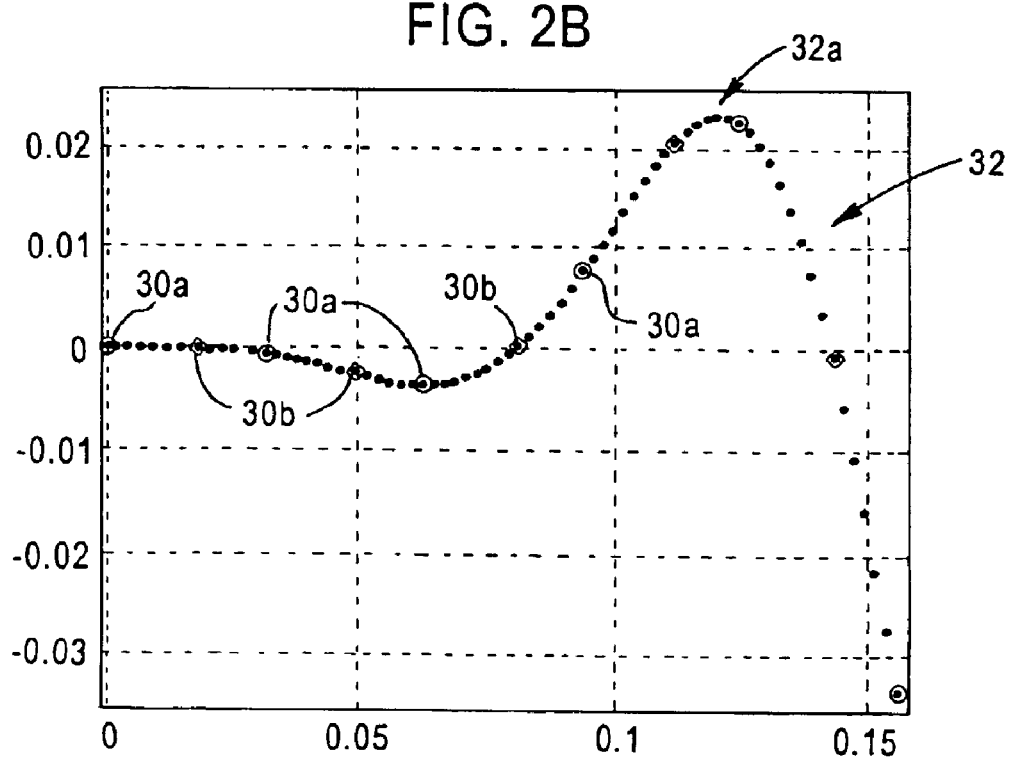

FIGS. 2A and 2B are diagrams illustrating the waveform samples of a prescribed transmit waveform 32, where FIG. 2B illustrates the transmit waveform 32 in further detail at a peak 32a. FIGS. 2A and 2B are used to illustrate the pulse shape where specified transmission times are given in multiples of a clock with normalized period $7/60$, and the actual transmission clock normalized period is $1/32$. The sample values 30 are plotted against a normalized timescale with a minimum sample spacing of $1/480=1/(15*32)$. The minimum sample spacing is determined based on the lowest common denominator between the different normalized clock periods $1/32$ and $1/60$. Hence, the number of pulse shape tables 16 corresponds to the number of possible phases 34 of the specified clock ($7/60$) relative to the transmit clock 24.

Figure 3:
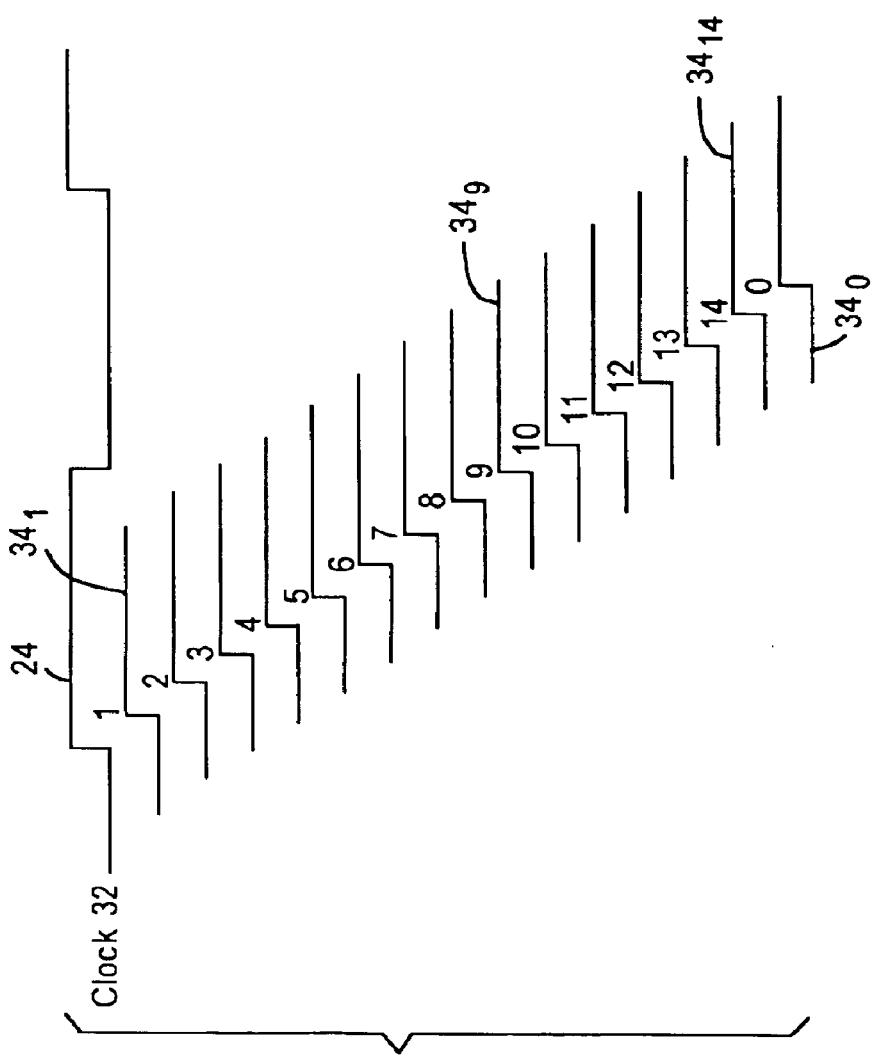
FIG. 3 is a diagram illustrating available phase offsets for the pulse shape tables of FIG. 1.

Each pulse shape table 16 is configured for outputting a corresponding waveform sample set 30, illustrated in FIGS. 2A and 2B, of a prescribed transmit waveform 32 relative to a corresponding phase offset 34, illustrated in FIG. 3. In particular, each table 16 is configured for storing equal time spaced waveform samples 30 starting with a corresponding delay time 34. For example, the pulse shape table $16_0$ would store thirty-two (32) waveform samples of the waveform sample set $30a$ representing samples of the transmit waveform 32 with the phase/time offset $34_0$, and the pulse shape table $16_9$ (not shown) would store thirty-two (32) waveform samples of the waveform sample set $30b$ representing samples of the transmit waveform 32 with the phase/time offset $34_9$. Hence, each pulse shape table 16 stores waveform samples having a normalized period spacing of $1/32$.

The phase correction module 14 retrieves from the coding block 12 the time interval values representing transmit data as integer multiples of the normalized period $7/60$ (i.e., "TIC times"), and determines a transmission time instant (i.e., the instant in time at which the waveform is to be output by the pulse position modulation communications system 10) for the prescribed waveform 32 relative to a start of frame. The phase correction module 14 also determines the phase error between the 32 MHz transmit clock 24 and the prescribed transmit clock having the normalized period of $7/60$ at the transmission time instant. The phase correction module 14 then selects samples 30 of the specified transmit pulse shape 32 that correct for the determined phase error between the 32 MHz clock and the prescribed $7/60$ transmit clock by outputting to the multiplexer 18 a Table Select signal having a value based on the determined phase error, and outputting to the pulse shape tables 16 a sequence of Table Address signals starting at the transmission time instant; hence, the analog pulse waveform output after analog reconstruction by the digital to analog converter (DAC) 20 and filtering by the low pass filter 22 is a signal having substantially zero phase noise relative to the prescribed transmit clock. Hence, the phase correction module 14 can correct for detected phase errors between the actual 32 MHz transmit clock 24 and the prescribed $7/60$ transmit clock, even when the actual transmit clock is not a simple frequency multiple of the prescribed transmit clock.

Figure 4:
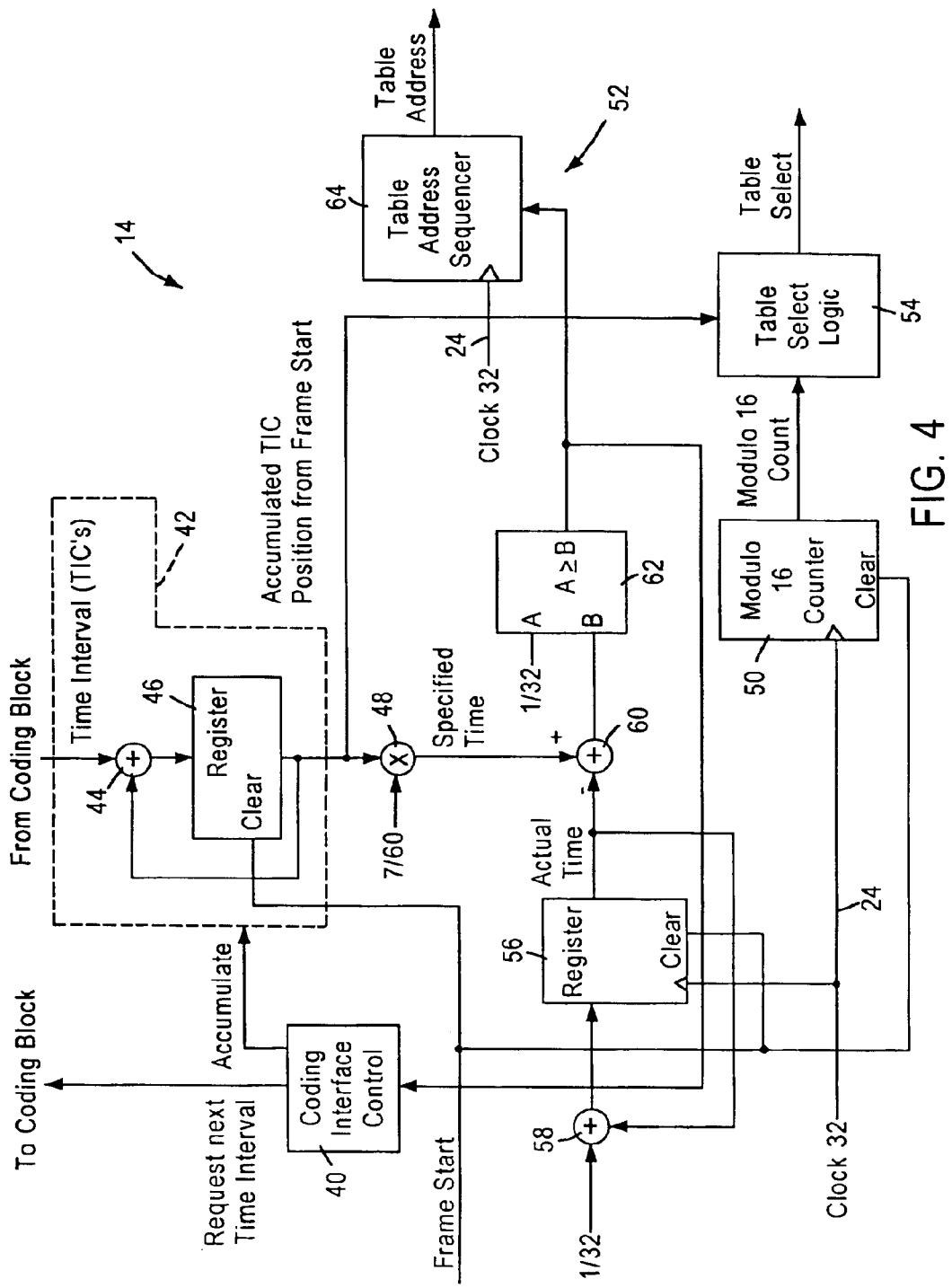
FIG. 4 is a diagram illustrating in detail the phase correction module of FIG. 1.

FIG. 4 is a block diagram illustrating in detail the phase correction module 14 of FIG. 1 according to an embodiment of the present invention. The phase correction module 14 includes a coding interface controller 40 configured for obtaining the time interval specifications from the coding block 12, relative to a start of frame signal received, for example, from an IEEE 802.3 based media access controller (not shown). In particular, the coding interface controller 40 obtains the successive time intervals, represented as integer multiples of TIC times, from the coding block 12.

The phase correction module 14 also includes an accumulator block 42, having an adder 44 and a register 46, and configured for determining the transmission time instant based on the obtained time intervals. In particular, the adder 44 adds the obtained integer value to previously accumulated integer values stored in the register 46 to obtain an accumulated integer. The register 46 is continually updated with the accumulated integer until cleared by the start of frame signal. Hence, the register 46 stores the next transmission time instant as an integer number of TIC times following the start of frame signal.

The phase correction module 14 also includes a multiplier 48 for calculating the transmission time instant as a specified time by multiplying the accumulated integer stored in the register 46 with a normalized value of the prescribed transmit clock, namely the normalized period $7/60$. Hence, the specified time represents the transmission time instant within the domain of the specified $7/60$ transmission clock.

The phase correction module 14 also includes a modulo counter 50 configured for counting through the number of available time offsets 34 each cycle of the 32 MHz clock 24 relative to the start of frame signal. The phase correction module 14 also includes a transmit clock incidence detector 52, and table select logic 54. The transmit clock incidence detector 52 includes a register 56, an adder 58, an adder 60, a comparator 62, and a sequencer 64. The register 56 is configured for storing accumulated values, calculated by the adder 58, of time intervals according to the normalized period $1/32$ and based on the 32 MHz transmit clock. Hence, the register 56 outputs the actual elapsed time from the start of frame signal according to the normalized period $1/32$ relative to the 32 MHz clock 24.

The adder 60 outputs the difference between the actual time (measured based on the normalized period $1/32$ based on the 32 MHz transmit clock) and the specified transmit time (based on the normalized period $7/60$ of the specified transmit clock), to the comparator 62, which outputs an output incidence signal when the difference output by the adder 60 is within the prescribed phase offset resolution of $1/32$, defined by the normalized period $1/32$. Hence, the comparator 62 outputs the output incidence signal to the table address sequencer 64 to identify an output incidence where the actual counted time relative to the 32 MHz transmit clock 24 coincides with the transmission time instant (i.e., the specified time) within the prescribed phase offset resolution based on the normalized period $1/32$. The table address sequencer 64, in response to reception of the output incidence signal, begins outputting the sequence of table address signals (i.e., the sequence of address values 0, 1, 2, . . . 31) based on the 32 MHz clock signal 24 to coincide with one of the offset signals 34 of FIG. 3.

Hence, the modulo counter 50 counts through one of the 15 possible modulo counter values each cycle of the 32 MHz transmit clock 24, representing the 15 possible phase offsets within the transmit clock cycle relative to the start of frame. The transmit clock incidence detector 52 detects the actual output incidence at which point the actual counted time relative to the transmit clock coincides with the transmission time instant within the waveform sample resolution. Hence, the phase correction module 14 uses the modulo counter value at the time the initiation of outputting the sequence of table address signals to identify the phase error between the transmit clock and the prescribed transmit clock relative to the transmission time instant.

Figure 5:
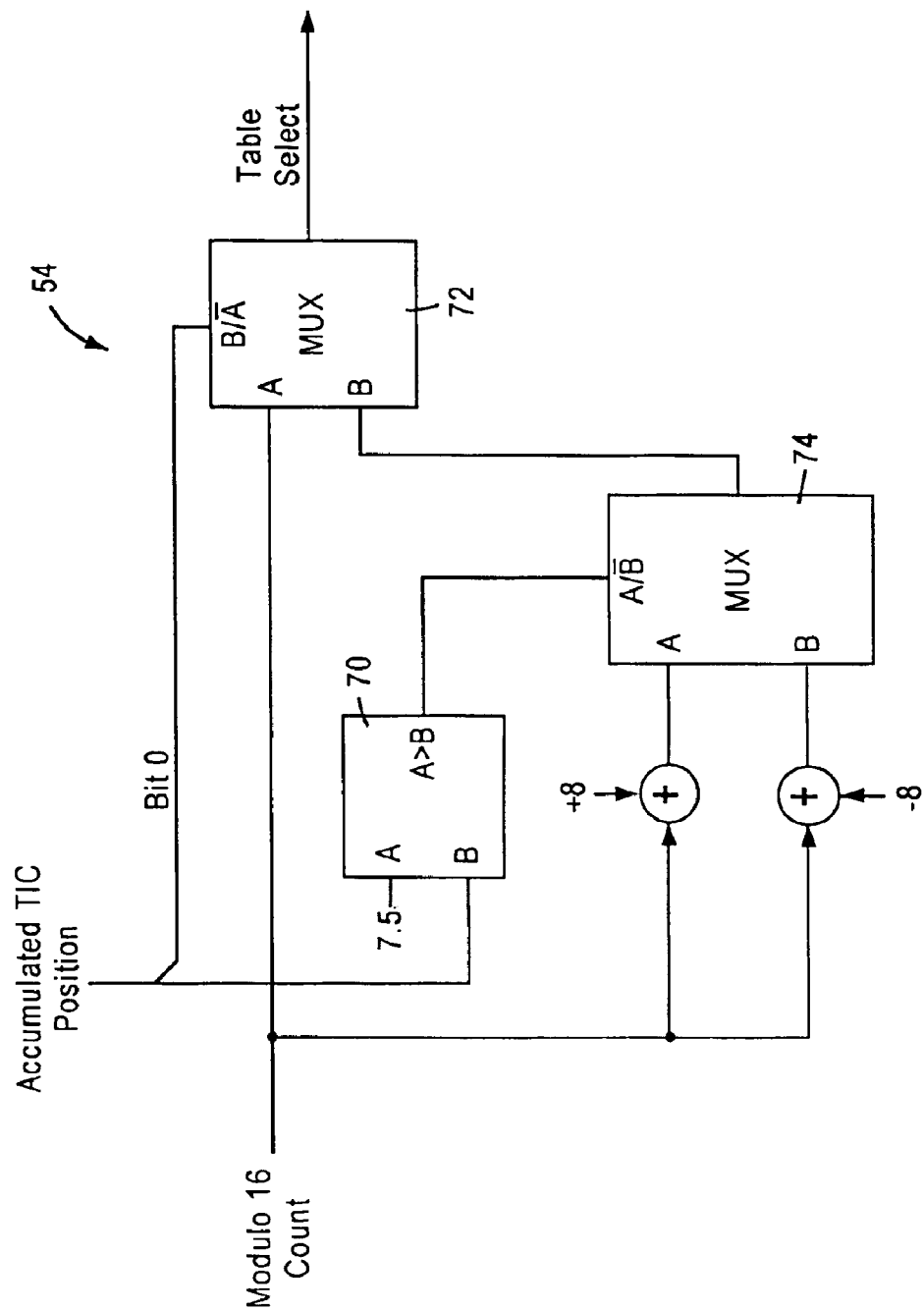
FIG. 5 is a diagram illustrating the table select logic of FIG. 4.
Figure 6:
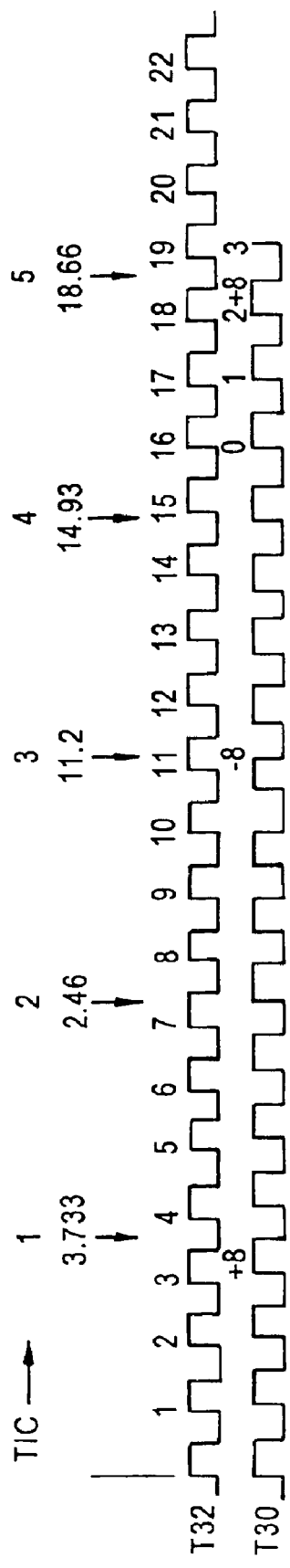
FIG. 6 is a diagram illustrating the relative difference between the transmit clock and a prescribed transmit clock.

The phase correction module 14 also includes table select logic 54, illustrated in detail in FIG. 5. The table select logic 54 includes a comparator 70 and multiplexers 72 and 74. The table select logic is configured for outputting the table select signal by selectively offsetting the modulo account value based on whether the accumulated integer value of the TIC time position is an even number or an odd number relative to the normalized multiple of the prescribed transmit clock. If the accumulated integer value is an even number (i.e., bit 0 equals 0), the multiplexer 72 outputs the modulo account value as the table select value to the multiplexer 18. However if the accumulated integer value is an odd number (i.e., bit 0 equals 1), the table select logic 54 offsets the modulo count based on whether the accumulated value is less than 7.5 or greater than 7.5. If the accumulated integer value is an odd number that is less than 7.5, a value of 8 is added to the modulo count, else if the accumulated integer value is an odd number that is greater than 7.5, the value of 8 is subtracted from the modulo count. Hence, the table select logic 54 corrects for computation of TIC numbers having an odd value, illustrated with respect to FIG. 6 relative to the 32 MHz clock and the specified 30 MHz clock.

Figure 7:
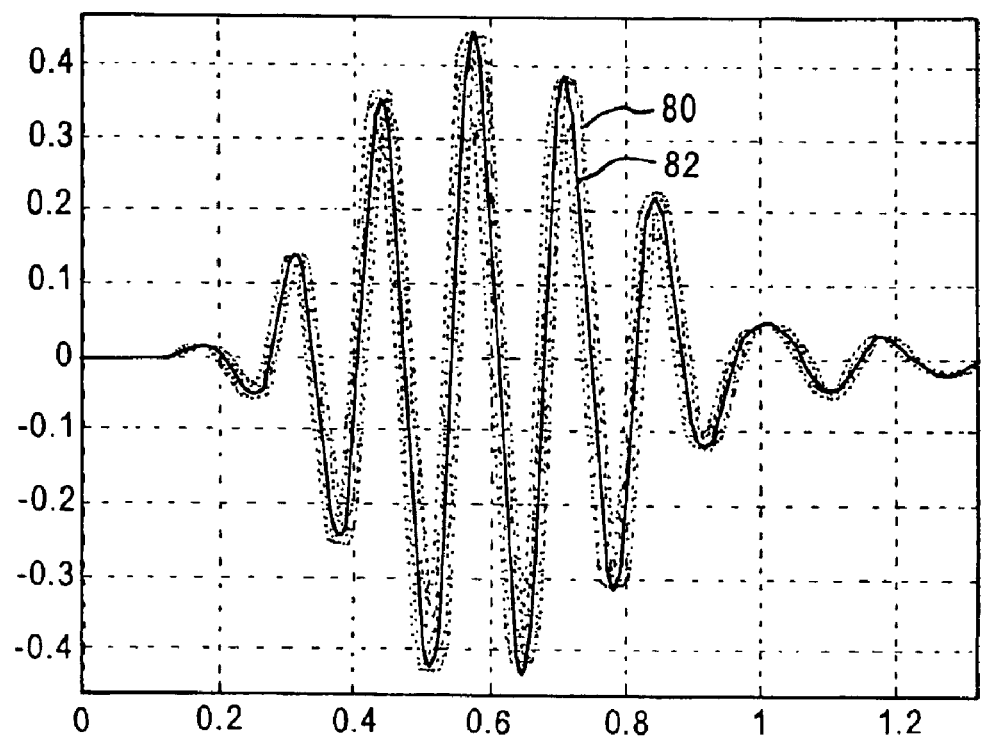
FIG. 7 is a diagram illustrating differences between an uncorrected analog output pulse and a corrected analog output pulse generated based on a waveform sample set having a corresponding phase offset from the phase correction system of FIG. 1.

Hence, the phase correction module 14 is able to determine a phase error between the transmit clock and a prescribed transmit clock relative to the transmission time instant. The phase correction module 14 outputs the sequence of table address signals to the pulse shape tables 16, and the table selection signal to the multiplexer 18 to determine the phase error at the transmission time instant. The multiplexer 18 outputs the waveform samples for the selected pulse shape table to the DAC 20, enabling the output waveform to correct for the detected phase error. For example, FIG. 7 is a diagram illustrating the simulated output of the analog low pass filter 22. The lightly shaded lines 80 illustrate the overlay of 15 output pulses being transmitted at multiples of the specified TIC time when only one pulse shaping table is used synchronous to the actual transmission ($1/32$) clock. The dark lines 82 illustrate the overlay of 15 output pulses being transmitted at multiples of the specified TIC time when 15 different pulse shaping tables are used as selected by the phase correction module 14, illustrating a significant reduction in jitter. In addition, the attached appendix illustrates a simulation program on page 1 and the results on pages 2 and 3. As shown in the results on pages 2 and 3 of the appendix, the integer TIC multiples create noninteger time offsets relative to the $1/32$ transmit clock, however the phase offset can be precisely corrected by integer-based selection of one of the 15 available waveforms from the respective pulse shape tables 16.

According to the disclosed embodiment, jitter can be substantially reduced in pulse position modulation communication systems by selecting appropriate samples of the specified pulse shape that compensate for detected phase differences between a specified transmit clock and the actual transmit clock. Moreover, the reduction in jitter can be implemented with minimal complexity, eliminating the necessity for more complex feedback systems.

Although the disclosed embodiment utilizes multiple pulse shape tables and a multiplexer for retrieval of the waveform samples having the proper phase offset for correcting the determined phase error, the phase shape table circuit 15 could be implemented as a single memory having multiple stored waveform samples in respective memory segments, where the selection signal is used for the most significant bits of an address signal to address a selected memory segment, and the address signals are used for the least significant bits of the address signal to sequentially address the waveform samples from the selected memory segment. The pulse shape table circuit 15 could also be implemented using a single pulse shape table 16 and an interpolator that interpolates the waveform samples based on the determined phase error.

While this invention has been described with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a transmission system configured for outputting a set of waveform samples starting at a transmission time instant according to a transmit clock, the method comprising:

determining a phase error between the transmit clock and a prescribed transmit clock relative to the transmission time instant; and outputting a selected waveform sample set based on the determined phase error, the waveform sample set having samples of a prescribed waveform relative to a corresponding phase offset, the phase offset of the selected waveform sample set correcting for the determined phase error.

2. The method of claim 1, further comprising:

obtaining a first time interval specification relative to a start of frame signal for a data frame to be transmitted; and determining the transmission time instant based on the first time interval specification and the start of frame signal.

3. The method of claim 2, wherein the step of obtaining the first time interval specification includes generating a request, to a coding block, for the first time interval specification.

4. The method of claim 2, wherein the step of determining the transmission time instant includes adding the first time interval specification to prior time interval specifications received following the start of frame signal to obtain an accumulated integer.

5. The method of claim 4, wherein the step of determining the transmission time instant includes calculating the transmission time instant by multiplying the accumulated integer by a normalized value of the prescribed transmit clock.

6. The method of claim 5, wherein the step of determining a phase error includes:

incrementing a modulo counter according to the transmit clock and based on the start of frame signal, the modulo counter outputting a modulo count having a number of possible values based on a corresponding number of different phase values between the prescribed transmit clock and the transmit clock, each possible value identifying a corresponding one of a plurality of the waveform sample sets having a corresponding phase offset; and identifying an output incidence where an actual counted time relative to the transmit clock coincides with the transmission time instant within a prescribed phase offset resolution.

7. The method of claim 6, wherein the outputting step includes selecting the selected one waveform sample set based on the modulo count value at the output incidence.

8. The method of claim 7, wherein the selecting step includes selecting the selected one waveform sample using one of the modulo count value and an offset value of the modulo count value based on whether the accumulated integer is an even number or an odd number.

9. The method of claim 2, wherein the step of determining a phase error includes:

incrementing a modulo counter according to the transmit clock and based on the start of frame signal, the modulo counter outputting a modulo count having a number of possible values based on a corresponding number of different phase values between the prescribed transmit clock and the transmit clock, each possible value identifying a corresponding one of a plurality of the waveform sample sets having a corresponding phase offset; and identifying an output incidence where an actual counted time relative to the transmit clock coincides with the transmission time instant within a prescribed phase offset resolution.

10. The method of claim 9, wherein the outputting step includes selecting the selected one waveform sample set based on the modulo count value at the output incidence.

11. The method of claim 10, wherein the selecting step includes selecting the selected one waveform sample by outputting to a multiplexer one of the modulo count value and an offset value of the modulo count value, based on whether the transmission time instant is an even number or an odd number relative to a normalized multiple of the transmit clock.

12. A transmission system configured for outputting a set of waveform samples starting at a transmission time instant according to a transmit clock, the system comprising:

a pulse shape table circuit configured for outputting a selected waveform sample set of a prescribed waveform relative to a selected phase offset in response to an address signal and a selection signal; and a phase correction module configured for determining a phase error between the transmit clock and a prescribed transmit clock relative to the transmission time instant, the phase correction module outputting the address signal and the selection signal at the transmission time instant for output of the selected waveform sample set correcting for the determined phase error.

13. The system of claim 12, wherein the phase correction module includes:

a coding interface controller configured for obtaining a first time interval specification relative to a start of frame signal for a data frame to be transmitted; and an accumulator block configured for determining the transmission time instant based on adding the first time interval specification to a previously accumulated integer relative to the start of frame signal to obtain an accumulated integer, and based on an accumulate signal output by the coding interface controller.

14. The system of claim 13, wherein the phase correction module further includes a multiplier for calculating the transmission time instant by multiplying the accumulated integer with a normalized value of the prescribed transmit clock.

15. The system of claim 12, wherein the phase correction module includes:

a modulo counter configured for modulo counting, as a modulo count, the selection signal each cycle of the transmit clock and based on a start of frame signal, the modulo count having a number of possible values based on a corresponding number of different phase values between the prescribed transmit clock and the transmit clock; and a transmit clock incidence detector configured for identifying an output incidence where an actual counted time relative to the transmit clock coincides with the transmission time instant within a prescribed phase offset resolution, the transmit clock incidence detector configured for outputting the address signal at the identified output incidence.

16. The system of claim 15, wherein the phase correction module further includes table select logic configured for outputting the selection signal by selectively offsetting the modulo count based on whether the transmission time instant is an even number or an odd number relative to a normalized multiple of the prescribed transmit clock.

17. The system of claim 12, wherein the pulse shape table circuit includes:

a plurality of pulse shape tables, each configured for outputting the corresponding waveform sample set of the prescribed waveform relative to a corresponding phase offset in response to the address signal; and a multiplexer configured for outputting from a selected one of the pulse shape tables the corresponding selected waveform sample set in response to the selection signal.

* * * * *